United States Patent Office 3,420,299
Patented Jan. 7, 1969

3,420,299
METHOD AND MEANS OF CEMENTING A CASING INTO A WELL STRUCTURE
Robert E. Cloud, 306 Montclair St., Longview, Tex. 75601
Filed Oct. 7, 1965, Ser. No. 493,787
U.S. Cl. 166—29
Int. Cl. E21b *33/13*
3 Claims

ABSTRACT OF THE DISCLOSURE

A method of preventing the shrinkage of a cement slurry during the setting thereof in casing operations. A plurality of encapsulated pellets are introduced into the slurry which expand at a predetermined time to compensate for the cement shrinkage.

---

Figures 1, 2:
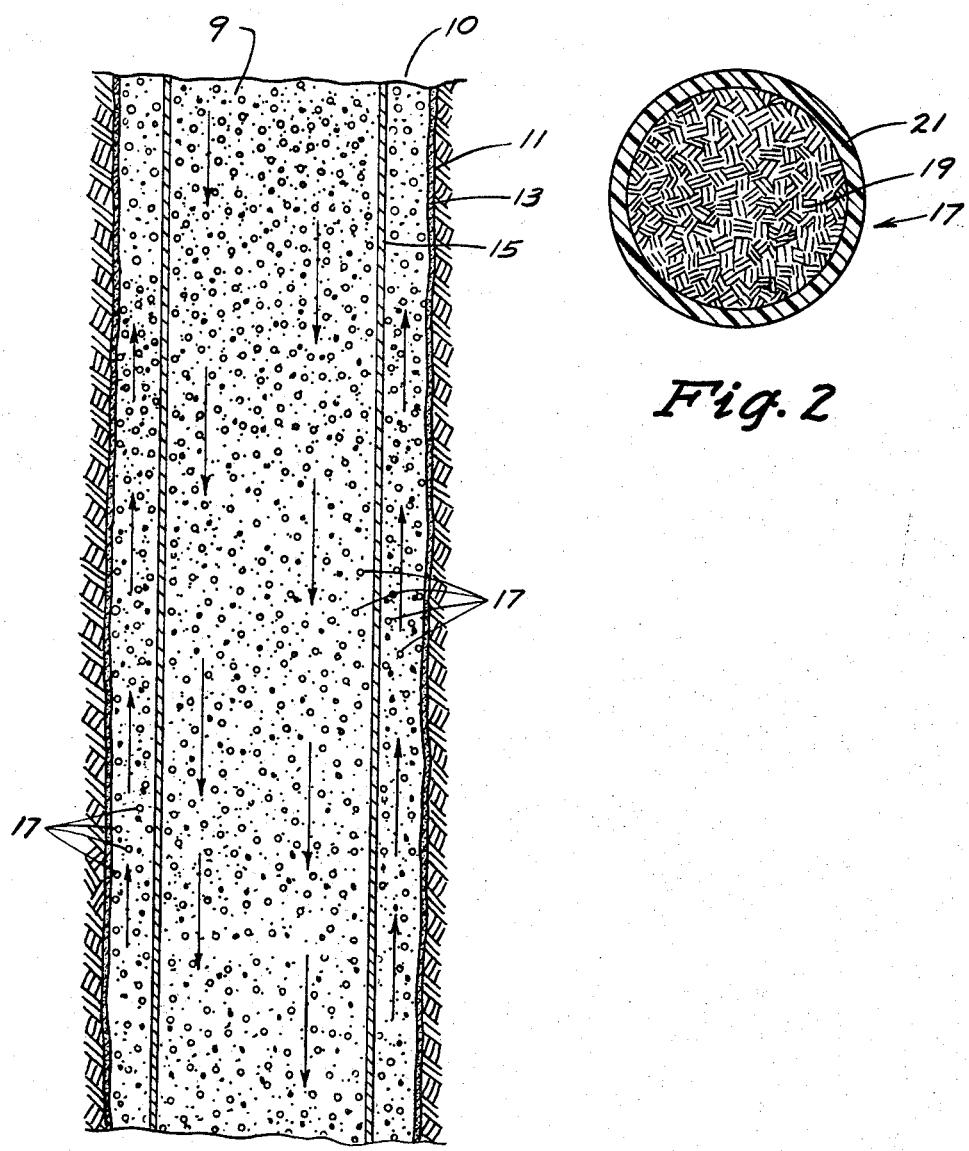

It is a laboratory proven fact that a cement slurry contracts a slight amount during the hardening or "setting" thereof. Such contraction or shrinkage of the cement slurry obviously presents many problems. The problem of cement slurry shinkage is especially troublesome in well drilling and completion operations wherein casing is cemented in the well. Casing is usually cemented in a well by pumping a cement slurry downwardly through the casing and thence upwardly between the outside of the casing and the well. When the cement slurry hardens and shrinks, "channels" or other imperfections in the hardened cement can mean the expenditure of thousands of dollars to correct these imperfections. Additionally, imperfections in the hardened cement can result in a complete loss of the usefulness of the well.

Therefore, it is a principal object of this invention to provide a means for preventing the shrinkage of a cement slurry during the hardening thereof.

A further object of this invention is to provide a method of cementing casing in a well wherein shrinkage of the cement slurry is prevented.

A further object of this invention is to provide a method of cementing casing in a well wherein encapsulated moisture absorbent pellets are introduced into the cement slurry.

A further object of this invention is to provide an encapsulated pellet for the introduction thereof into a cement slurry wherein the encapsulating material is soluble.

A further object of this invention is to provide an encapsulated pellet for introduction into a cement slurry which not only prevents the shrinkage of the cement slurry but also serves to scour and scrub the well-bore walls.

A further object of this invention is to provide an encapsulated pellet for the introduction thereof into a cement slurry which causes the cement slurry to "flash-set."

A further object of this invention is to provide a means for preventing the shrinkage of a cement slurry which is economical of manufacture.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings, in which:

FIG. 1 is a sectional view of a well bore illustrating the casing positioned therein and illustrating the flow of the cement slurry therethrough; and FIG. 2 is a cross-sectional view of the encapsulated pellet.

The numeral 9 generally designates a cement slurry while numeral 10 generally designates a well bore having a wall surface 11 which is coated with a drilling mud material 13. The coating of the walls of the well with a drilling mud material is necessary during the actual drilling of the well but adversely affects casing cementing operations. When the well has been drilled, it is usually necessary or desirable to place a string of casing 15 in the well. Casing used in oil and gas wells is designed to serve several purposes. It supports the walls of the well and checks caving tendencies of unconsolidated formations. Casing may be used to exclude fluids in some intervals than that from which it is desired to produce; also, it prevents escape of formation fluid through the well from one stratum to another. The cost of casing is usually the greatest single item of expense in the cost of an oil or gas well and it can therefore be appreciated the importance of properly cementing the casing in the well. The usual method of cementing the casing in the well is to pump a cement slurry downwardly through the casing and thence upwardly between the casing and the walls of the well. When the cement slurry hardens, the casing is held rigidly in place.

To prevent the shrinkage of the cement slurry during the hardening or "setting" thereof, an encapsulated pellet 17 has been devised. Pellet 17 may be of any shape or configuration. For convenience, the drawings illustrate pellet 17 as being substantially round. Pellet 17 includes a central portion 19 and an encapsulating material 21 extending therearound. Central portion 19 consists of a moisture absorbent material which permanently expands upon absorption of moisture thereinto. It has been found that bentonite or plaster of Paris both work equally well when used as the central portion 19 of the pellet 17. Bentonite and plaster of Paris both absorb moisture and expand upon the absorption of moisture thereinto. Additionally, plaster of Paris is a quick setting material which gives off heat during the setting thereof which would raise the temperature of the cement slurry and tend to cause the cement slurry to "flash-set" and therefore cause the entire cement job to become firmly affixed more quickly, saving additional time and consequent expense normally connected therewith.

Encapsulating material 21 encapsulates central portion 19 and is moisture or temperature soluble (thermolabile) or a combination thereof. Encapsulating material 21 may also be designed to be pressure rupturable. Any suitable material may be used for encapsulating material 21, such as gelatin, jell-like muds, plastic, etc., as long as the encapsulating material 21 does not adversely affect the physical properties of the cement. The encapsulating material 21 may be applied to central portion 19 by any convenient method, such as spraying, tumbling, etc.

In operation, a predetermined amount of pellets 17 are introduced into the cement slurry as the cement is pumped downwardly into the casing. The exact amount of pellets to be so introduced into the slurry depends upon the physical characteristics of the particular cement being used. The encapsulating material 21 prevents the central portion 19 from absorbing moisture for a predetermined length of time. The pellets 17 and cement slurry is pumped from the lower end of the casing up between the walls of the well and the casing. The pellets 17 contact the walls of the well and "scour" and "scrub" the drilling mud therefrom which aids in obtaining a good contact between the cement and the walls of the well.

When a sufficient amount of cement has been pumped between the walls of the well and the casing, the cement is forced out of the casing with conventional appliances. When encapsulating material 21 is of a moisture soluble material, the moisture in the cement will dissolve the encapsulating material 21 and permit central portion 19 to absorb moisture and expand. The length of time necessary to dissolve encapsulating material 21 will depend upon the thickness thereof. The expansion of central portions 19 in each of the pellets 17 in the cement slurry during the hardening of the cement compensates for the shrinkage of the cement to prevent "channels" or the like from forming. If desired, the encapsulating material 21 may be of a heat soluble or thermolabile material which will dissolve upon the generation of heat by the hardening cement. It is also possible to make the encapsulating material 21 of a thermolabile and moisture soluble material or of a pressure rupturable material.

Pellets 17 do not adversely affect the strength of the cement due to the fact that they are interspersed throughout the cement. While pellets 17 have been described as being particularly adaptable to the cementing of casing in a well, it is obvious that they could also be used in other cement jobs wherein shrinkage creates problems.

Additionally, pellets 17 are highly suitable for aiding in the packing or filling of fractures or other soft or open zones wherein lost circulation of drilling fluids do occur during the actual drilling of the well. Pellets 17 would be added to the drilling fluid in the desired amount depending upon the physical and chemical characteristics of the drilling fluid and the nature of the cause of lost circulation.

Thus it can be seen from the foregoing that all of the stated objectives of this invention have been accomplished.

Some changes may be made in the construction and arrangement of my method and means of cementing a casing into a well structure without departing from the real spirit and purpose of my invention.

I claim:

1. The method of cementing casing in a well comprising the following steps:

pumping a cement slurry downwardly into said casing whereby said slurry will be forced out of said casing between said casing and the walls of said well,
said slurry containing a plurality of pellets therein, said pellets being adapted to expand during the hardening of said slurry to compensate for the shrinkage of said slurry during said hardening process,
said pellets being encapsulated by a thermolabile material adapted to dissolve at a predetermined temperature when the cement slurry begins to harden and produces heat.

2. The method of claim 1 wherein each of said pellets are comprised of a bentonite material which is encapsulated by the thermolabile material.

3. The method of claim 1 wherein each of said pellets are comprised of a plaster of Paris material which is encapsulated by the thermolabile material.

References Cited

UNITED STATES PATENTS

| 3,340,929 | 9/1967 | Slagle | 166—29 |
| 2,492,212 | 12/1949 | Dailey | 166—33 X |
| 2,836,555 | 5/1958 | Armentrout | 166—29 X |
| 3,028,913 | 4/1962 | Armentrout | 166—29 |
| 3,227,213 | 1/1966 | Smtih | 166—29 |

FOREIGN PATENTS 805,848 12/1958 Great Britain.

JAMES A. LEPPINK, *Primary Examiner.*

U.S. Cl. X.R.

166—21